Patented Feb. 23, 1937

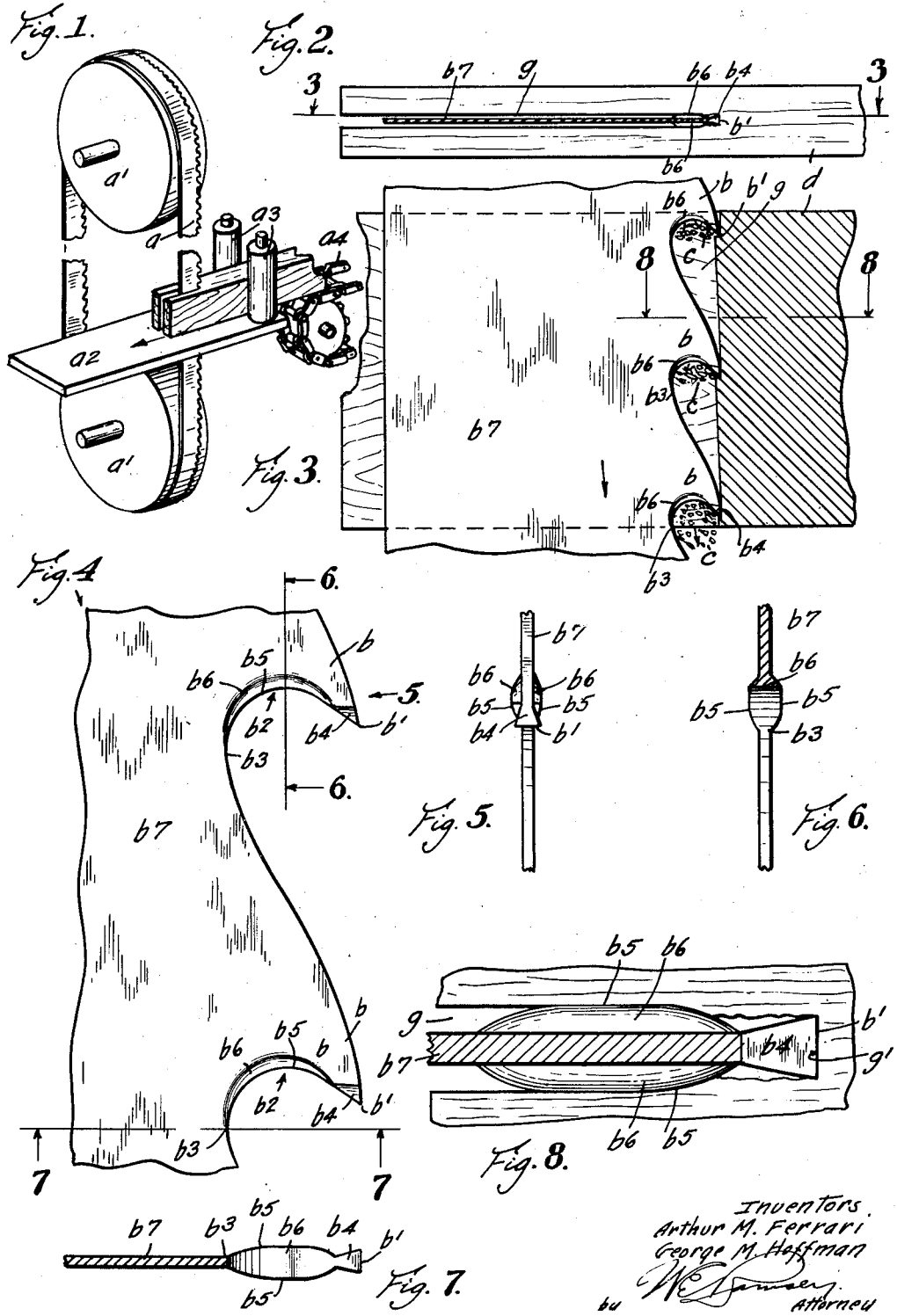

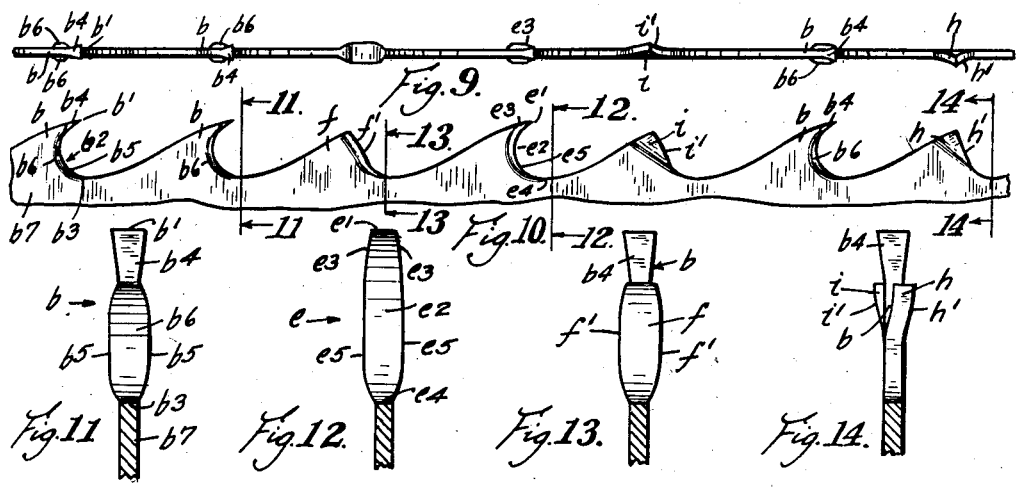
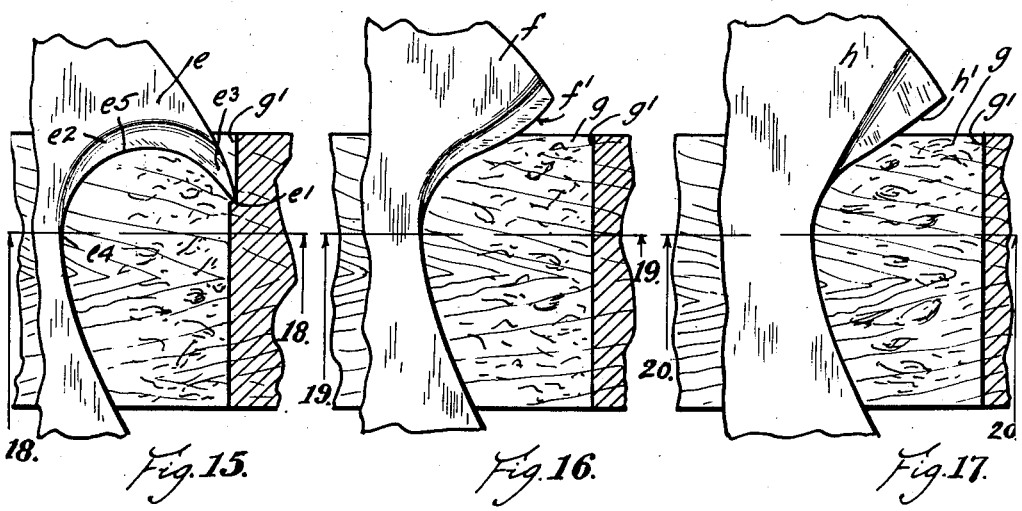
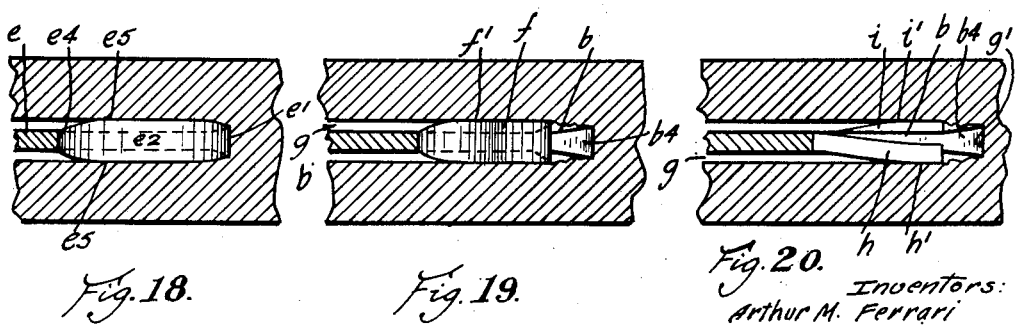

2,071,618

UNITED STATES PATENT OFFICE 2,071,618

METHOD AND MEANS FOR SAW-SURFACING AND CLEANING A SAW KERF

Arthur M. Ferrari and George M. Hoffman, Algoma, Oreg.

Application January 4, 1936, Serial No. 57,482

4 Claims. (Cl. 143—140)

The object of our invention is to provide a novel method of sawing by which a relatively smooth surfaced saw kerf is produced free of sawdust and splinters; to produce said result by a novel saw and the tooth arrangement of said saw; and to provide a machine utilizing such a saw and functioning mechanically to follow such method.

Our invention has particular application to the production of box shooks. In the manufacture of box shooks a board or other section of wood of unit thickness is cut into a plurality of sections constituting said shooks and it is desirable that the surfaces formed by said severing saw kerf be smooth and as free from sawdust and splinters as is possible. Many types of cleaning agencies and surface devices have been provided by which the shooks are severed by a saw kerf and are later acted upon by separate agencies and devices tending to smooth up the sides of the kerf or merely to remove the sawdust and splinters therefrom.

We attain this object by forming the forward or cutting edge of a saw so that the section to be resawed to form the shook is first ripped by a relatively narrow kerf and is later but almost immediately widened to its eventual width by laterally extending cutting edges which dress down the sides of the kerf while increasing said kerf to its full width. Said edges function also to remove the sawdust and partially severed splinters. This is all done before the saw enters substantially into the section of wood. This prevents dust from falling into the kerf lodging against the side walls thereof and becoming so embedded therein that it is difficult to remove. That is, all of the agencies with which we are familiar produce a kerf with its attendant sawdust, permit the sawdust to move down the side edges of the blade and become embedded in the roughened surface. Then means are provided for dressing said surface and incidentally removing the sawdust or else attempting to remove the sawdust out of said roughened surface.

Our method thus forms a narrow kerf, immediately increases said kerf to its full width and coincidentally therewith removes the debris formed by the saw kerf which otherwise becomes a source of trouble.

Details of our invention and the mode of operation thereof are hereinafter described with reference to the accompanying drawings, in which:

Fig. 1 is a more or less diagrammatic perspective view of the essential elements of a resaw by which a board is severed into halves by the formation of a kerf through its middle; the driving mechanism and accessory equipment is not shown as the relation of said essential parts to a complete machine is obvious to a person skilled in the art;

Fig. 2 is a fragmentary view looking down on a portion of one edge of a board being sawed, said figure illustrates the manner in which a saw embodying our invention operates;

Fig. 3 is a section taken on the line 3—3 in Fig. 2, this figure diagrammatically illustrates the manner in which a saw embodying our invention operates;

Fig. 3 is a section taken on the line 3—3 in Fig. 2, this figure diagrammatically illustrates the manner in which a saw embodying our invention operates first to rip and then to surface the sides of the kerf, removing the particles of wood cut away substantially as they are produced;

Fig. 4 is a fragmentary view on an enlarged scale illustrating the structure of two saw teeth embodying our invention;

Fig. 5 is a fragmentary elevation taken in the direction of the arrow 5 in Fig. 4 of one of said saw teeth;

Fig. 6 is a fragmentary section taken on the line 6—6 in Fig. 4 through said saw tooth;

Fig. 7 is a cross-sectional view taken on the line 7—7 in Fig. 4 looking into the gullet of the other of said saw teeth;

Fig. 8 is an enlarged sectional view taken substantially on the line 8—8 in Fig. 3 diagrammatically illustrating the action of a saw tooth embodying our invention which first rips roughly the board to be severed and then increases the width of the kerf and surfaces the side walls thereof;

Fig. 9 is a plan view looking down on the cutting edge of a saw showing several different modifications of teeth embodying our invention;

Fig. 10 is a fragmentary elevation thereof vertically alined with the toothed edge shown in Fig. 9 and illustrates the details of said modifications in elevation;

Fig. 11 is a fragmentary cross-sectional view looking into the gullet of the modification shown in Figs. 1 to 8, inclusive, and is taken substantially on the line 11—11 in Fig. 10;

Fig. 12 is a similar view taken substantially on the line 12—12 in Fig. 10 of a modified tooth embodying our invention;

Fig. 13 is a section taken substantially on the line 13—13 in Fig. 10 showing two teeth in alinement, the forward one of which in this figure defines the lateral scraping edges and the one lying rearwardly thereof defining the ripping point;

Fig. 14 is a section taken substantially on the line 14—14 in Fig. 10 and shows three alined teeth, the first one being offset to the right as shown in said figure, the middle one being substantially alined with the saw blade and the third one being offset to the left, the first and third teeth carrying the lateral surfacing edges surfacing the opposite sides of the kerf, respectively, the middle tooth carrying the ripping point for forming the initial portion of the kerf;

Fig. 15 is a diagrammatic view of the modification shown in Fig. 12 illustrating how the point first enters the board forming a narrow ripped kerf while the outwardly flared portion, extending into the throat of said tooth, defines two laterally extending edges for enlarging the kerf and surfacing the side walls thereof;

Fig. 16 is a similar view showing the action of the foremost short tooth shown in Fig. 13 and illustrates how said short tooth functions to surface the side walls of the kerf and to enlarge its width;

Fig. 17 is a view of one of the offset teeth shown in Fig. 14 and diagrammatically illustrates the action of said tooth in the manner of the two preceding figures;

Fig. 18 is a plan section looking upwardly on the line 18—18 in Fig. 15 showing how the modificaton shown in Fig. 15 enters the kerf and dresses the side walls thereof;

Fig. 19 is a section taken from the line 19—19 of Fig. 16 and illustrates said modification in the same manner as does Fig. 18; and Fig. 20 is a plan view similar to the two previous figures except that it is taken on the line 20—20 of the modification shown in Fig. 17.

One type of machine which is particularly adapted for our invention is a so-called resaw by which boards or sections of wood of unit thickness are cut into a plurality of shooks of proportionately less thickness by a kerf running substantially thru the middle of the edge of the board. The boards are preferably fed thru said machine on their edges and at the discharge side of said saw are arranged in stacks with the opposed faces of the separate shooks severed and arranged face to face. Maximum production on machines of this character is of utmost importance and the workman "offbearing" on this machine is given no opportunity to shake the boards and free any sawdust which might lodge in between the surfaces or faces of the shooks. The output of a resaw usually is limited by the ability of the man "offbearing" from the machine to pick up the said shooks and arrange them in stacked relation. In the absence of means for removing said sawdust prior to their being taken away from the machine and after the sawing operation sawdust is lodged upon the faces of the shooks by the production of the kerf and is held there when the shooks are packaged. Sawdust and partially severed splinters as well as the rough surfaces produced by the saw in forming the kerf thus constitute objectionable factors.

In Fig. 1 we illustrate the essential elements of a resaw which comprises an endless bandsaw $a$ extending about two rotatable pulleys $a'$, a table $a2$, feed rolls $a3$ and a delivery chain $a4$. These, of course, are carried by a frame and are provided with power units and assume many differing structural forms. In some resaws the bands are arranged vertically and in some horizontally. Some have a plurality of saws, both circular and band type, which are frequently arranged vertically and horizontally, respectively, in the same machine. Our invention is not limited to any particular type of resaw or sawing machine and it is for this reason we have only illustrated the essential parts of a sawing machine. The pertinency of the parts shown, and their relation to the whole will immediately be obvious to persons skilled in the art.

Our invention is particularly applicable to an endless band saw and one modification of our invention is illustrated in Figs. 2 to 8, inclusive, and Fig. 11. In this modification the teeth $b$ are shown as having typical contour, that is, the points $b'$ extend in hooked-shape along one edge of the saw blade. The portions of each saw tooth $b$ leading up to the point $b'$ makes an acute angle at said point and the gullet $b2$ curves inwardly under said point. The sweep of the gullet merges in a smooth circle past the root $b3$ of the tooth and extends upon an O—G curve to the next tooth.

The point $b'$ of the tooth is wedge-shaped in plan, as is shown most clearly in Fig. 8, the point $b'$ being of greater width than the portions $b4$ lying immediately behind it. The gullet $b3$ is preferably swaged outwardly and shaped to provide two lateral edges $b5$ of substantial length. Said edges extend substantially the full depth of the gullet from the portion $b4$ to the root $b3$ of the tooth. This is most clearly shown in Fig. 4.

The enlarged portion $b6$ is inwardly cupped and extends to a point at the root of the tooth where the bottom extends further towards the adjacent tooth than does the point thereof. Thus, sawdust $c$ cut away from a board $d$ tends to be pocketed in said enlarged portion $b6$ and to be pulled along therewith as the saw passes thru the board. This tends to prevent the sawdust from passing down the sides $b7$ of the saw blade to fill the previously formed part of the kerf $g$ and to be rubbed into the side walls of the kerf which have previously been ripped and dressed. This is one of the important advantages of our invention.

The enlarged portion $b6$ is preferably formed by swaging and shaping and thus there is a relatively large triangular section of metal behind said enlarged portions as is shown in Fig. 6. This section tapers outwardly to the lateral edges $b5$ which are relatively sharp. The inclination of the sides of said section is such, however, that only the edge scrapes along the side walls of the kerf to remove the uneven surfaces, sawdust and splinters and widens the kerf to the desired degree.

The relative width of the saw blade $b7$ before it is swaged to form the teeth, the enlarged portion $b6$ and the point $b'$ are all exaggerated to bring out their structural features. In practice the parts are not swaged as greatly as is shown and it is possible to cut the eventual kerf of less width than is commonly required at the present time. This seemingly results from the removal of the roughened splinters, sawdust and other debris which thus does not bind the sides of the saw to the sides of the kerf and thus less clearance may be provided.

In Fig. 9 we show the toothed edge of a saw in which the teeth are swaged and shaped to different proportions and we show several different modifications, each embodying our invention. Of course, it is not the practice to embody each of the modifications in a single blade but they are shown in a single blade for comparison and to show several of the modifications which our invention may take. In Fig. 11 the preferred form of tooth is shown, namely, the one previously described in Figs. 1 to 8, inclusive.

Fig. 12 shows a tooth e in which the point e' is slightly narrower than the intermediate portions e2. Said intermediate portions carry the cutting edges e5 and taper into the point e' along a tapered section e3 adjacent the point thereof. As in the previous modification the point e' cuts a kerf of narrower width than is desired and the continued flare of the tooth causes the remainder of the cutting of the kerf to be done by the lateral edges e5 rather than the point e'. In this modification also the point e' overlies the intermediate portions e2, that is, the enlarged intermediate portions e2 carrying the lateral edges e5 extend out beyond the point e where said edges merge into the root e4 of the tooth. This modification also tends to catch sawdust in the concave throat of the tooth and to pull it along and prevent it from filtering down the sides of the saw where some of it would become lodged against the sides of the kerf, which is to be avoided.

In Fig. 13 we illustrate how teeth f can be spaced along the saw at predetermined intervals and be devoid of a ripping point. The tooth f thus will have only the function of surfacing the sidewalls of the kerf and removing sawdust. Its contour is convex along the lateral edges f' as is shown in Fig. 6. Said lateral edges, however, extend downwardly to the root of the tooth as far as possible and face outwardly towards the line of the ripping teeth. That is, said lateral edges f' face outwardly towards the end g' of the kerf g being formed. The tooth f thus is a special purpose tooth merely dressing the sides of the kerf and one of the adjacent teeth b, which is shown extending over the top of the tooth f produces the narrower ripping cut in advance of the action of the tooth f.

In Figure 14 we illustrate how side dressing teeth can be "spring set" alternately to the left and the right. Thus, the tooth h would be "spring set" to the right to dress the right hand side of the kerf while the spring tooth i which is spring set to the left will dress the left hand surface thereof. One or more teeth b having ripping points can be arranged between the teeth h and i or they can be successive. In Figure 14 we illustrate that a ripping tooth b is arranged between said tooth, the ripping tooth being of the type shown in Fig. 11. The spring set tooth h is provided with a cutting edge h' only along one side. The spring set tooth i is provided with a cutting edge i' along the other side.

Forming a band saw with teeth along one side, which teeth rip and finish, permits the saw to be given tension in the ordinary manner.

Said saw teeth in forming and dressing a kerf thus have two distinct functions which are successive in point of time and are complementary to each other. The first function is to rip a narrow kerf into the board to sever the same and this is produced by the points of the teeth. The kerf is next widened to the full desired width and the edges are dressed by the laterally projecting cutting edges on the various modified forms of teeth. Both of these functions are thus performed by teeth lying along one edge of said saw and are produced without much, if any, additional strain on the saw and at no greater expenditure of time than when the teeth are formed merely to rip.

As is well known a band saw blade although it is a ribbon of saw steel, functions like a string, that is, the cutting edge is given more tension than the remainder and thus the saw is functionally considered as having negligible width. It has been proposed heretofore that one saw blade can produce surfaced lumber by providing cutting agencies along both edges. The teeth along the forward edge do the ripping and the teeth on the trailing edge do the surfacing. This, however, requires that both cutting edges be tense and the saw thus acts as two spaced elements or one of ribbon-like form having substantial width. This might be compared to saying that one saw is thus given an action comparable to two strings spaced apart, one lying along each of the edges of the saw. The cutting strains upon both edges thus will localize the tension at spaced points.

Spacing the operating agencies at opposite edges of the saw also requires that the ripping teeth at the forward edge be swaged or thickened to a dimension where they will form a kerf sufficiently wide so as not to bind the saw. Dressing said kerf by the trailing edge thus removes more material than is necessary to permit the saw to function properly. As has heretofore been brought out if the surfaces at the sides of the kerf are rough and uneven and carry splinters and sawdust a greater clearance must be provided to prevent binding. This is eliminated in our invention where the sides are clean and smooth and are thus free of binding agencies as they pass over the back or non-cutting portion of the saw.

It is to be understood that the face of each of the saw teeth is concaved slightly in grinding. The degree of concavity can be varied by changing sizes of grinder wheels. This can also be done to a greater or lesser degree in the swaging and shaping operations. We have determined that a greater degree of concavity should be provided in our teeth having lateral edges than is ordinarily provided in ripping teeth.

We claim:

1. A saw blade provided with a plurality of spaced teeth extending along one edge, the points of the saw teeth constituting ripping elements lying along a line defining the leading portion of said edge, certain portions of the faces of said teeth lying between said line and a line extending thru their roots being wider than said points and the thickness of the body of the saw blade, said portions diverging in the direction of said latter line, lateral cutting edges formed along said diverging portions constituting laterally extending scraping or planing agencies for surfacing the sides of the kerf initially formed by said ripping elements.

2. A saw blade provided with a plurality of spaced teeth extending along one edge, the points of the saw teeth constituting ripping elements lying along a line defining the leading portion of said edge, certain portions of the faces of said teeth lying between said line and a line extending thru their roots being swaged wider than said points and the thickness of the body of the saw blade, said portions being formed so as to be diverging in the direction of said latter line, lateral cutting edges formed along said diverging portions constituting laterally extending scraping or planing agencies for surfacing the sides of the kerf initially formed by said ripping elements.

3. A saw blade provided with a plurality of spaced teeth extending along one edge, the points of the saw teeth constituting ripping elements lying along a line defining the leading portion of said edge, certain portions of the faces of said teeth lying between said line and a line extending thru their roots being wider than said points and the thickness of the body of the saw blade, said portions diverging at equal opposite angles in the direction of said latter line, lateral cutting edges formed along said diverging portions constituting laterally extending scraping or planing agencies for surfacing the sides of the kerf initially formed by said ripping elements.

4. In woodworking, the method of ripping a kerf and cleaning and surfacing the sides thereof during its production consisting in initiating and deepening said kerf to a substantial width but less than its eventual width and immediately thereafter and by the same agency progressively increasing the width of the kerf by equal and opposite laterally diverging cutting operations thereby planing and dressing the sides of said kerf to bring it to its eventual width.

ARTHUR M. FERRARI.
GEORGE M. HOFFMAN.